United States Patent Office 3,027,685
Patented Apr. 3, 1962

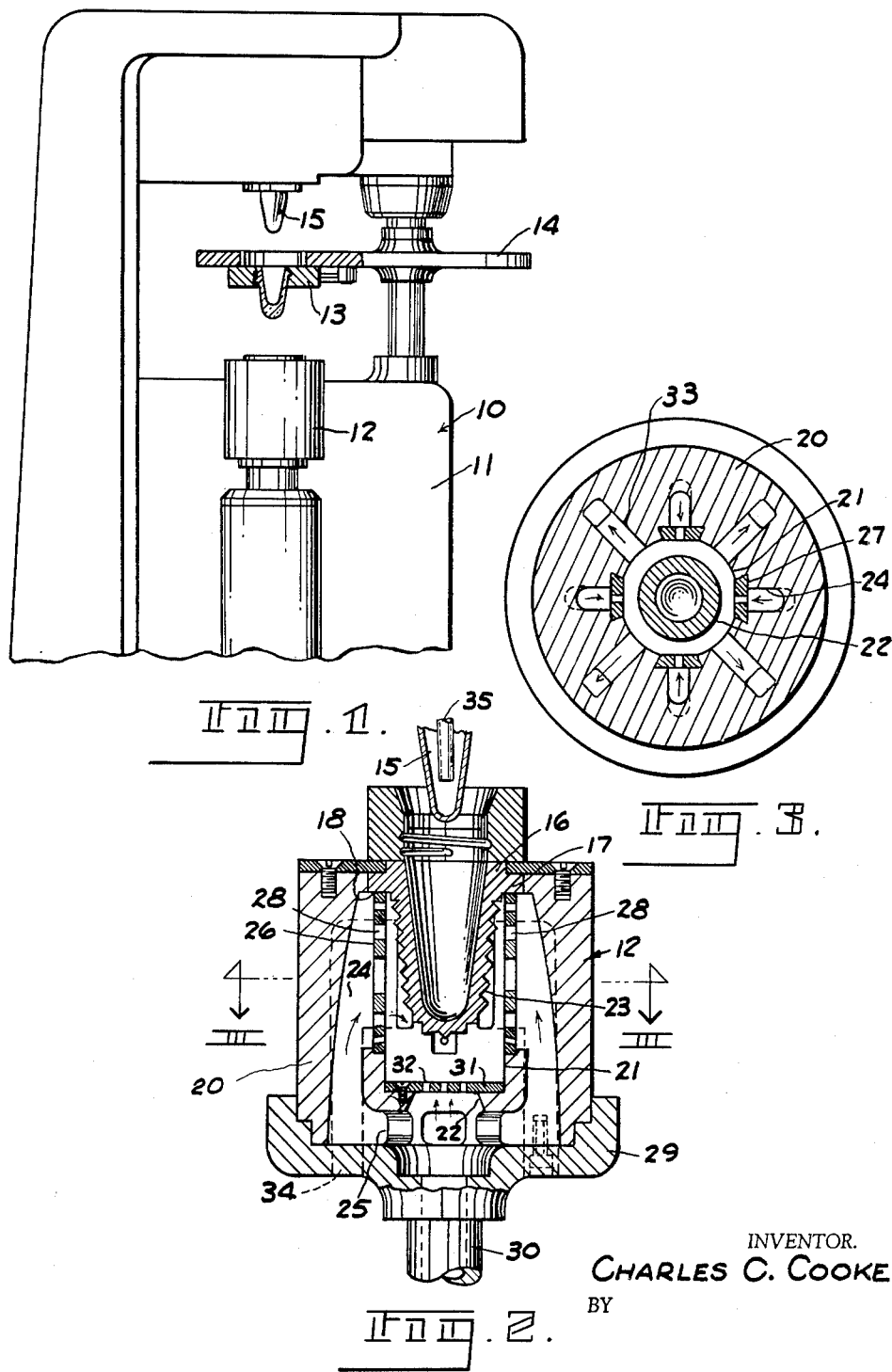

3,027,685
COOLING APPARATUS FOR GLASS
FORMING MOLDS
Charles C. Cooke, Toledo, Ohio, assignor to Owens-
Illinois Glass Company, a corporation of Ohio
Filed Feb. 16, 1959, Ser. No. 793,353
8 Claims. (Cl. 49—68)

This invention relates to the manufacture of glass containers and particularly to the forming of hollow glass parisons which are subsequently blown into hollow glass containers.

In the patent to Weber 2,688,823, there is disclosed a method and apparatus wherein a hollow parison is formed from a gob of molten glass and a predetermined chilling of the parison is provided throughout its entire surface area, both internally and externally by applying cooling fluid in a predetermined manner to the parison mold. By such a controlled chilling, there is a controlled resistance to subsequent blowing or expansion of the parison. By varying the degree of chilling in different longitudinal zones, the nature and rate of expansion of any portion of the parison with respect to any other portion of the parison may be controlled thereby controlling the distribution of the glass in various portions of the final blown glass article.

It is an object of this invention to provide a novel apparatus for applying the cooling fluid to the external surface of the parison mold.

It is a further object of this invention to provide such an apparatus which will accurately produce the desired distribution of cooling fluid.

It is a further object of the invention to provide such an apparatus which may be manufactured easily and at low cost.

In the drawings:

FIG. 1 is a elevation partly in section of a forming machine embodying the invention.

FIG. 2 is an elevation partly in section of a portion of the machine shown in FIG. 1.

FIG. 3 is a sectional view taken along the line III—III in FIG. 2 with the plunger removed.

Referring to FIG. 1, forming machine 10 comprises a base 11 on which a parison mold assembly 12 is mounted for vertical reciprocating movement into and out of register with a neck mold 13 on a rotating table 14. A plunger 15 is mounted on base 11 above table 14 for reciprocating movement downwardly into register with the neck mold 13 and into parison mold 16 in parison mold assembly 12. Plunger 15 and parison mold 16 are made of heat conducting material.

In practice, a charge or gob of molten glass is fed to parison mold 16. While the neck mold 13 is in register with the parison mold, plunger 15 is moved downwardly into parison mold 16 to press the gob of glass into a hollow parison. Plunger 15 is hollow and is provided with a cooling nozzle 35 therein which supplies cooling fluid to cool the plunger and in turn the internal surface of the parison which is formed.

According to the invention, the parison mold assembly 12 includes novel means for applying cooling fluid to the external surface of the parison mold 16. As shown in FIGS. 2 and 3, the parison mold assembly 12 comprises a cylindrical body 20 which has an opening or cavity extending vertically therethrough, the opening having an upper portion 21 and a lower portion 22 of lesser diameter. Parison mold 16 is formed with a peripheral flange 17 on the upper end thereof which engages a shoulder 18 on the upper end of the cylindrical portion 21 of the opening. The parison mold 16 is also formed with longitudinally spaced annular ribs 23 which are spaced from the wall of the upper portion 21 of the opening in body 20.

Body 20 is formed with a plurality of circumferentially spaced longitudinally extending supply grooves 24 on the wall surface of the upper portion 21 of the opening. The lower ends of the grooves communicate with the lower portion 22 of the opening through passages 25. Removable plates or members 26 of uniform thickness are provided over the grooves adjacent the parison mold 16. The longitudinal edges of each plate 26 are shaped to engage the dovetail recesses 27 in the wall surface of portion 21. The plates are slid downwardly into position and engage the body 20 at their lower ends and are held against upward movement by flange 17 on the upper end of the parison mold. Each plate or member 26 is provided with a plurality of longitudinally spaced apertures 28 of predetermined size and spacing for controlling the distribution of cooling fluid to the external surface of the parison mold 16. The body 20 rests on a support 29 which has a supply pipe 30 on the under side thereof for supplying cooling fluid to the lower portion 22 of the opening. A horizontal plate 31 having apertures 32 therein is provided between the portions 21 and 22 of the opening.

Body 20 is also formed with circumferentially spaced longitudinally extending exhaust grooves 33, one groove 33 being provided between each pair of supply grooves 24. The lower ends of the grooves 33 communicate with the exterior atmosphere through openings 34 in the support 29.

When cooling fluid is supplied through pipe 30, it passes through passages 25 to supply grooves 24 and then through the apertures in the plates 26 radially inwardly against the external surface of the parison mold 16. In addition, cooling fluid passes upwardly through the apertures 32 in base plate 31 to cool the lower end of the parison mold 16. After contacting the parison mold, the fluid is exhausted through exhaust grooves 33.

The predetermined size and spacing of the apertures 28 and 32 in the plates 26 and 31, respectively, provide for a controlled distribution of the cooling fluid to the external surface of the parison mold 16 in a plurality of longitudinally spaced circumferential zones so that the parison is cooled and chilled in a predetermined fashion. When the parison is subsequently expanded, the resistance to expansion is controlled to give the proper glass distribution as more completely described in the aforementioned patent to Weber 2,688,823.

By the above apparatus, it is possible to change the distribution of cooling fluid merely by removing the plates 26 and replacing them with plates having a different predetermined size and spacing of apertures 28.

Since the plates are flat permitting apertures to be readily located and machined therein, an accurate positioning of the apertures therein is more easily accomplished at a lower cost.

I claim:

1. In an apparatus for forming hollow glass parisons, the combination comprising a parison mold, a support defining an open ended cavity within which said parison mold is positioned, the latter closing the open upper end of said cavity, said parison mold having its external surface radially spaced from said support, and said support having a plurality of circumferentially spaced, axially extending, cooling fluid supply grooves facing said parison mold, and an insert individual to each said groove mounted in said support and closing the face of each said groove, each said insert being provided with a plurality of apertures that are spaced axially in relation to said mold means in said support and connected to said grooves for supplying cooling fluid to said grooves, said support having a plurality of circumferentially spaced axially extending exhaust grooves in the wall thereof facing said parison mold, and passages defined in said support extending from said exhaust grooves to the exterior of said support.

2. In an apparatus for forming hollow glass parisons, the combination comprising a unitary support having a wall defining an open ended cavity, a parison mold positioned in said cavity and closing the open upper end of said cavity, said parison mold having its external surface radially spaced from the wall of said support, said support having a plurality of circumferentially spaced axially extending cooling fluid supply grooves in the wall thereof facing said parison mold, and a flat plate individual to each said groove removably mounted in said support and closing the face of each said groove, said support being formed with dovetail recesses adjacent the axially disposed edges of each groove, each said plate having oppositely extending edges shaped to engage said recesses, each said plate being provided with a plurality of apertures spaced axially in relation to said mold, means in said support and connected to said grooves for supplying cooling fluid to said grooves, said support having a plurality of circumferentially spaced axially extending exhaust grooves in the wall thereof facing said parison mold, and passages defined in said support extending from said exhaust grooves to the exterior of said support.

3. In an apparatus for forming hollow glass parisons, the combination comprising a parison mold, a unitary support defining an open ended cavity within which said parison mold is positioned, said parison mold having its external surface radially spaced from the wall of said support, said support having a plurality of circumferentially spaced axially extending cooling fluid supply grooves facing said parison mold, and a flat plate individual to each said groove removably mounted in said support and closing the face of each said groove, said support being formed with dovetail recesses adjacent the axially disposed edges of each groove, each said plate having oppositely extending edges shaped to engage said recesses, said parison mold having a peripheral flange on the upper end thereof, said flange engaging the upper ends of said plates and holding said plates thereby closing the open upper end of said cavity in position on said support, each said plate being provided with axially spaced apertures, means in said support and conected to said grooves for supplying cooling fluid to said grooves, said support having a plurality of circumferentially spaced axially extending exhaust grooves that are alternately arranged intermediate said cooling fluid supply grooves each of which face said parison mold, and means provided in said support connecting said exhaust grooves to the exterior of said support.

4. In an apparatus for forming hollow glass articles, the combination comprising a support including a wall thereon, a forming mold positioned in a radially inwardly spaced relationship with said wall, said support wall defining a plurality of circumferentially spaced, axially extending cooling fluid supply grooves facing the external surface of said mold, and an insertable plate-like member individual to each said groove and mounted on said support, each said member closing the face of each said groove, and each said member being provided with plural axially spaced apertures therethrough, means connected to said support for supplying cooling fluid to said grooves, and means provided in said support and connected to the space that is defined between said members and the exterior surface of the mold and the exterior of said support for exhausting fluid introduced through said apertures, whereby coolant fluid is applied radially onto the mold and circulated past its external surface.

5. In an apparatus for forming hollow glass articles, the combination comprising a mold support, a forming mold positioned on said support, an axially extending wall spaced radially outwardly from the external surface of said mold, a plurality of circumferentially spaced axially extending cooling fluid supply channels along said walls, each said channel being opened along a side thereof facing the external surface of said mold, and an insertable apertured member individual to each said channel detachably mounted across said open side of the channel closing that opened face thereof and spaced radially from the exterior surface of said mold, each said member having a plurality of axially spaced apertures, means connected to the support for supplying cooling fluid to said channels, and means provided in said support and connected to the exterior of said support for exhausting coolant fluid from the space defined between the exterior surface of said mold and said members, whereby the coolant fluid that is supplied through said apertures is circulated past the external surface of said mold.

6. In an apparatus for forming hollow glass parisons, the combination comprising a parison mold, a unitary support defining an open ended cavity within which said parison mold is positioned, the parison mold closing the open upper end of said cavity, said parison mold having its external surface radially spaced from said support, said support having a plurality of circumferentially spaced, elongated, axially extending, cooling fluid supply grooves facing said parison mold, and a correspondingly elongated, flat plate individual to each said groove removably mounted in said support and closing the face of each said groove, said plate being spaced from said parison mold, said support being formed with dovetail recesses adjacent the longitudinal edges of each said elongated groove, each plate having its longitudinal edges shaped to engage said recesses, and each said plate being provided with apertures spaced axially thereof, said support having an axial inlet opening in the lower end thereof communicating with said cavity, and said support having secondary passages therein connecting said axial inlet and said supply grooves, an apertured plate, means on said support for positioning said last mentioned plate transversely of said cavity between said secondary passages and said parison, said support having a plurality of circumferentially spaced, axially extending, exhaust grooves facing said parison mold, and passages defined in said support connecting said exhaust grooves to the exterior of said support.

7. In an apparatus for forming hollow glass parisons, the combination comprising a parison mold, a support defining an open ended cavity, within which said parison mold is positioned, said parison mold having its external surface radially spaced from said support, said support having a plurality of circumferentially spaced axially extending cooling fluid supply grooves facing said parison mold, and an insert individual to each said groove mounted in said support and closing the face of each said groove, each said insert being spaced radially from said parison mold and provided with a plurality of spaced apertures, means in said support and connected to said grooves for supplying cooling fluid to said grooves, and fluid conduit means provided in said support connecting the interior of said cavity and the exterior of said support for exhausting fluid from said cavity.

8. In an apparatus for forming hollow glass parisons, the combination comprising a parison mold, a support defining an open ended cavity within which said parison mold is positioned, the latter closing the open upper end of said cavity, said parison mold having its external surface radially spaced from said support, and said support having a plurality of circumferentially spaced axially extending cooling fluid supply grooves facing said parison mold, a flat plate individual to each said groove removably mounted in said support and closing the face of each said groove, each said plate being spaced radially from said parison mold and provided with axially spaced apertures, means in said support and connected to said grooves for supplying cooling fluid to said grooves, and fluid conduit means provided in said support connecting the interior of said cavity and the exterior of said support for transmitting coolant in exhausting fluid from said cavity.

References Cited in the file of this patent

UNITED STATES PATENTS

| | | |
|---|---|---|
| 1,531,415 | Said | Mar. 31, 1925 |
| 1,632,992 | Bragg | June 21, 1927 |
| 1,633,028 | La France | June 21, 1927 |
| 2,054,553 | Ballard | Sept. 15, 1936 |
| 2,269,553 | Roessler | Jan. 13, 1942 |
| 2,751,715 | Denman | June 26, 1956 |